UNITED STATES PATENT OFFICE.

WILLIAM F. McNABB, OF PITTSBURGH, PENNSYLVANIA.

HEAT-PRODUCING COMPOUND.

1,309,209. Specification of Letters Patent. Patented July 8, 1919.

No Drawing. Application filed January 13, 1917. Serial No. 142,134.

*To all whom it may concern:*

Be it known that I, WILLIAM F. McNABB, a resident of Pittsburgh, in the county of Allegheny and State of Pennsylvania, have invented a new and useful Improvement in Heat-Producing Compounds, of which the following is a specification.

This invention relates to heat producing compounds, that is, compounds in which the heat is produced by chemical reaction of the ingredients.

The object of the invention is to provide a compound for the purpose specified which can be cheaply compounded, which is stable when in the dry state but which nevertheless gives a strong reaction when water is added, and which will produce a high degree of heat.

In prior heat producing compounds the heat has been produced by the reaction of sodium hydroxid, *i. e.*, commercial caustic soda, upon a metal, generally aluminum. The aluminum or other metal is the costly ingredient of the mixture.

In the new compound the heat is produced by the reaction of an alkaline hydrate, such as sodium hydroxid (NaOH) or potassium hydroxid (KOH), upon some alkaline acid or bisulfate, or oxygenized or persulfate. These may be the acid or oxygenized sulfates of either ammonium, sodium or potassium, or any two or more such salts. Such sulfates produce a high intense heat and sustain the heat for a long period of time.

The potassium salts, either the hydroxid or the sulfates, produce a more energetic reaction than do the sodium and ammonium salts, but as the sodium and ammonium salts are cheaper they will generally be used in preference to the potassium salts.

All of the alkaline acid or oxygenized sulfates are cheap as compared to the metals heretofore used, and consequently the compound is cheap to make and at the same time is very effective, being capable of raising water to a temperature of 212 degrees Fahrenheit.

The several ingredients are mixed in a dry state and are packed in air-tight cans or other containers and are then perfectly stable. They are used by simply adding water to the compound, whereupon a strong chemical reaction immediately takes place, producing a high degree of heat.

Various mixtures of the several ingredients can be made, depending upon the use to which the compound is to be put. The hydrate element will generally be either sodium or potassium hydroxid, and the sulfate element can be any one of the several acid or oxygenized sulfates above named, or any two or more thereof. The proportion of the several ingredients will also vary according to the use to which the compound is to be put. I have found a very effective compound to consist of sodium hydroxid 3 parts, sodium bisulfate 1 part, and ammonium persulfate 1 part. Approximately 16 ounces of such compound will have added to it approximately 2 quarts of water when using, and the reaction of the compound will raise the temperature of the water as high as 212 degrees Fahrenheit. When it is desired to generate heat, irrespective of other consideration, the proportion of the sodium hydroxid to the acid or oxygenized sulfates will be increased. The proportions mentioned are, however, merely illustrative, as other proportions will give satisfactory results.

When ammonium salts are used, a certain amount of anhydrous sodium carbonate or other alkaline carbonate may be added to the compound, not for the purpose of generating heat but to neutralize the odor of the ammonia gas which is evolved, in such uses where the evolution of the ammonia gas is undesirable. Other ingredients may also be added, depending upon the use to which the compound is to be put.

What I claim is:—

1. A heat producing compound containing an alkaline hydrate and an alkaline bisulfate.

2. A heat producing compound containing an alkaline bisulfate, an alkaline hydrate, and an alkaline persulfate.

3. A heat producing compound containing an alkaline hydrate, an alkaline bisulfate, ammonia salt and an alkaline carbonate.

4. A heat producing compound containing an alkaline hydrate, an alkaline bisulfate, ammonium persulfate, and an alkaline carbonate.

In testimony whereof, I have hereunto set my hand.

WILLIAM F. McNABB.

Witnesses:
GLENN H. LERESCHE,
C. B. SANDERSON.